United States Patent [19]
Arnold et al.

[11] 3,958,335
[45] May 25, 1976

[54] ANGLE SETTING MECHANISM, IN PARTICULAR FOR VISES

[76] Inventors: Franz Arnold, Spatzenweg 20, 8960 Kempten, Germany; Oscar Boehm, Basagoiti 31, Algorta (Viscaya), Spain

[22] Filed: Nov. 18, 1974

[21] Appl. No.: 525,045

[30] Foreign Application Priority Data
Nov. 23, 1973 Germany.................. 7341746[U]

[52] U.S. Cl............................ 33/75 R; 33/174 TD; 269/81
[51] Int. Cl.².................................. G01B 3/56
[58] Field of Search.... 33/174 TD, DIG. 1, 174 TA, 33/75 R; 269/77, 78, 81

[56] References Cited
UNITED STATES PATENTS

| | | | |
|---|---|---|---|
| 1,703,017 | 2/1929 | Singer..................... | 33/174 TD X |
| 2,538,640 | 1/1951 | Click...................... | 33/174 TD X |
| 2,921,377 | 1/1960 | Hohl....................... | 33/DIG. 1 |

Primary Examiner—William D. Martin, Jr.
Attorney, Agent, or Firm—Woodhams, Blanchard and Flynn

[57] ABSTRACT

Angle setting mechanism, particularly for vises mounted on the table of a machine tool. There is provided an angle setting mechanism for use with vises, primarily on the table of a machine tool, which indicates a preselected angle with respect to said table. The vise is then aligned with respect to, preferably by contact against, said indicating device and clamped in position. In one preferred form of the vise, a guiding anchor member or slide is provided in the T-slot of the table and a block is positioned pivotally with respect thereto. Angle measuring means are provided therebetween whereby said block may be positioned with respect to said guide at a preselected angle and then clamped in such position. The vise is then brought to bear against said block, positioned with an appropriate face in contact therewith in order that the vise may assume said same angle and said vise is then clamped in position. The indicating device may then be removed if desired.

11 Claims, 11 Drawing Figures

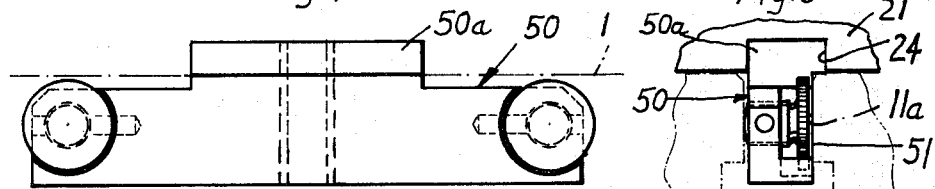
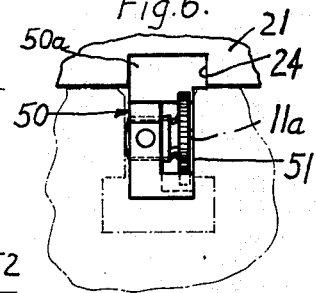
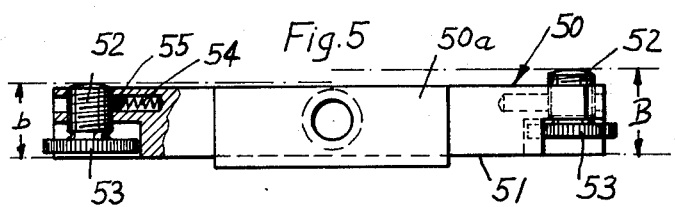
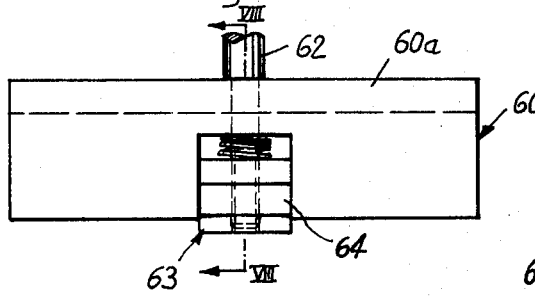
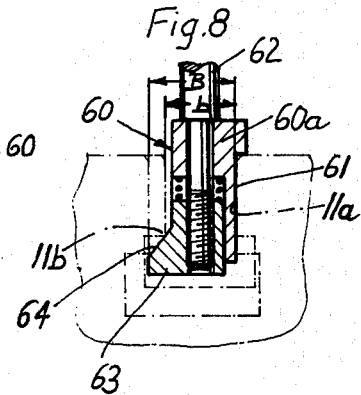
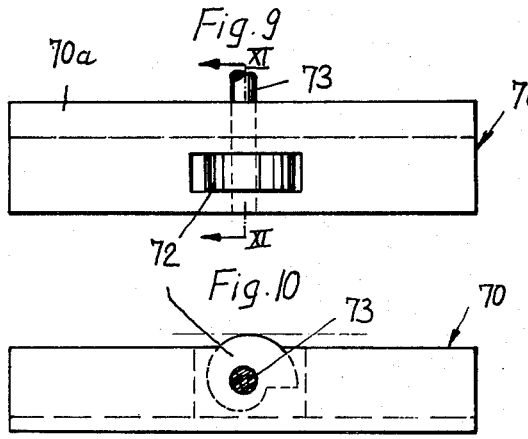
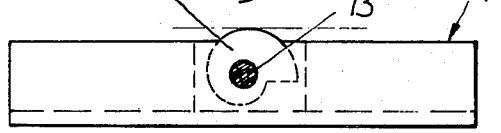
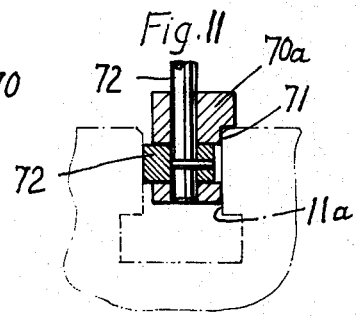

ANGLE SETTING MECHANISM, IN PARTICULAR FOR VISES

FIELD OF THE INVENTION

The invention relates to an angle setting mechanism, in particular for vises.

BACKGROUND OF THE INVENTION

In order to carry out certain operations on a workpiece, which operations deviate from a 90° angle, vises must be appropriately positioned with respect to one of the T-grooves of the machine table and must then be clamped. Various angle setting mechanisms are known for this positioning.

The most common angle setting mechanism consists in a so-called flat plate arranged below the vise base plate, which flat plate is provided with a graduation. The base plate itself is secured by screws which are screwed into anchor blocks in the T-grooves of the machine table. The base plate of the vise is in turn supported pivotally about a vertical axis on the flat plate and carries a zero line, which cooperates with the graduation. The base plate of the vise can in turn be clamped relative to the flat plate. Due to the elevated arrangement of said base plate on the flat plate, in which arrangement the base plate is also only partly supported by the flat plate, there is a considerable lessening in stability so that no great cutting pressures can be applied on the clamped workpiece and further the precision of the machining operation can be effected. It is further disadvantageous that each vise, with which there is any likelihood of utilization for machining operations at angles other than 90°, must be equipped with a flat plate. Particularly, a later installing of the flat plate is not possible in most cases because the zero line of the base plate must be calibrated exactly on the flat plate. Since operations at other than a 90° angle are not often carried out, it is not feasible to equip vises with a flat plate which will only seldom be used.

Furthermore bevels and protractors are known, the use of which in vises usually creates difficulties, because said measuring instruments are usually constructed of insufficient strength. They can deform and thus permit no exact adjustment. Moreover, the mentioned bevels and protractors have in most cases no part which directly engages one of the T-grooves of the machine table.

SUMMARY OF THE INVENTION

Therefore the basic purpose of the invention is to produce an angle setting mechanism for vises, which mechanism is independent of the vise, which is characterized by a simple structure and a high level of exactness in adjustment.

The angle adjustment is characterized according to the invention by:

a. a pivot, on the underside of which is secured a reference slide which can be inserted into the T-groove of the machine table, and which fits snugly into the leg section of the T-groove or onto an anchor member which can be adjusted in the leg section of the T-groove, b. a graduated disk which is supported rotatably and clampingly on the pivot, which graduated disk has a graduation and a flat stop face perpendicularly arranged to the undersurface for resting on a planar side surface of the vise, c. an indexing plate which is fixedly connected to the upper end of the pivot and has a vernier cooperating with the graduation, the zero line of which indexing plate is fixed exactly opposite and perpendicular to a side surface of the reference slide which lies in the leg section of the T-groove or a side surface of an adjustable anchor member, and d. a clamping mechanism for clamping the graduated disk with respect to the pivot.

Since the new angle setting mechanism is independent of the vise, one angle setting mechanism can be used for adjusting several vises. Also one can purchase same at any time at a later date and independent of the type of the vise used in a particular case wherein the only condition is that a plane surface be available on the vise. Such surface, however, is usually so present in most vises or such surface can be provided later by appropriate machining. Since the new setting mechanism is mounted laterally on the vise, its structural height is not increased. The inventive angle setting mechanism has also advantages over vise constructions in which a graduation is provided within the base plate, because in these known vise constructions, the vise base plate is weakened in its area which is stressed the most by the recess necessary for the angle setting mechanism. Finally it may be mentioned that the angle setting mechanism can be removed after adjusting and clamping of the vise so that it is not exposed to stress during machining and furthermore cannot be damaged by chips, workpieces and cooling fluid.

BRIEF DESCRIPTION OF THE DRAWINGS

The invention will be discussed more in detail hereinafter in connection with one exemplary embodiment which is illustrated in the drawings, in which:

FIG. 4 is a side view of a first exemplary embodiment of an adjustable anchor member, FIG. 5 is a top view of said anchor member, FIG. 6 is a front view of same, FIG. 7 is a side view of a second exemplary embodiment of an adjustable anchor member, FIG. 8 is a cross-sectional view along the line VIII—VIII of FIG. 7, FIG. 9 is a side view of a third exemplary embodiment of an adjustable anchor member, FIG. 10 is a top view of said anchor member of FIG. 9, FIG. 11 is a cross-sectional view along the line XI—XI of FIG. 9.

DETAILED DESCRIPTION

Figure 3:
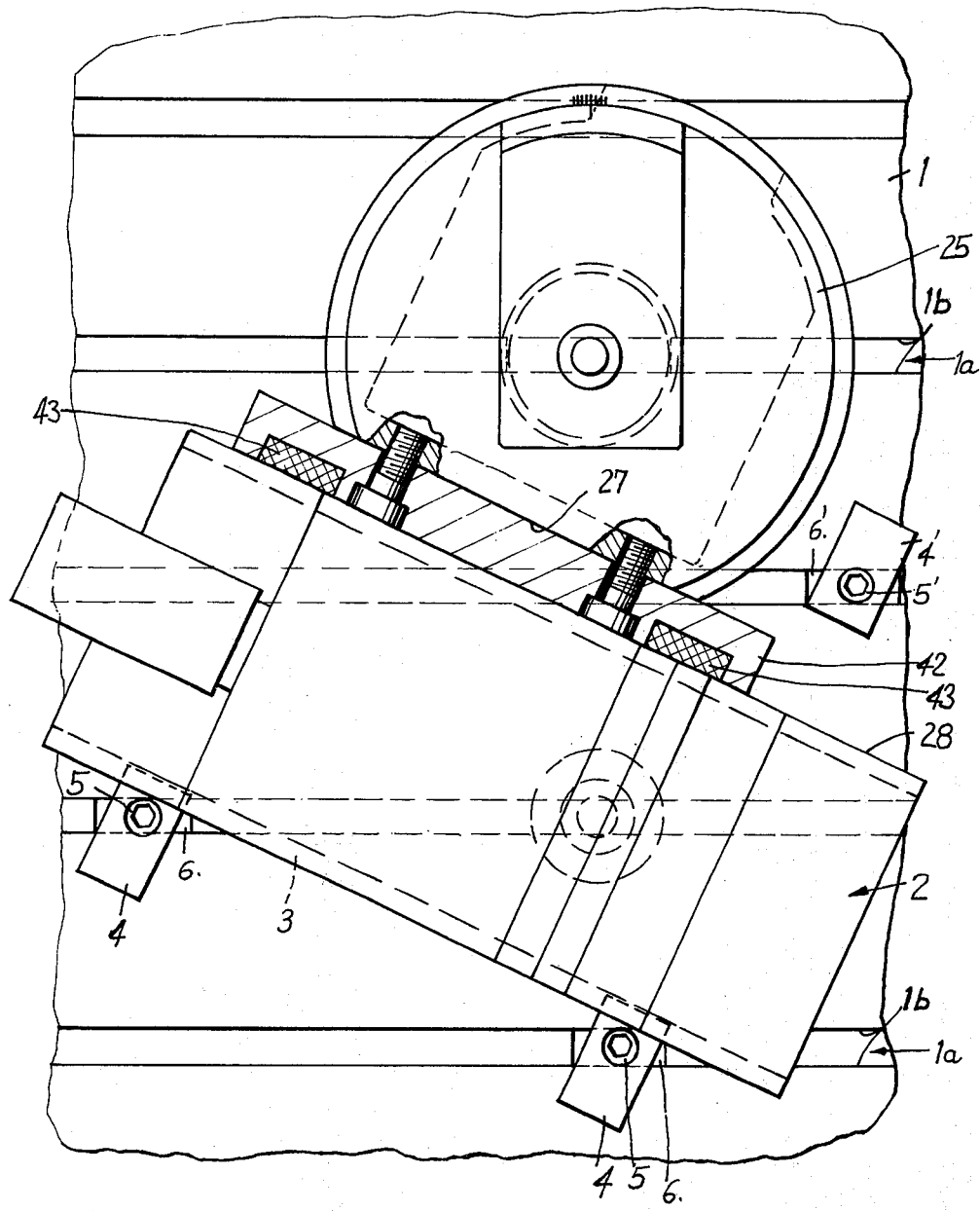
FIG. 3 is a top view of the angle setting mechanism, the vise and the machine table.

Reference numeral 1 in the drawings designates the machine table, onto which can be mounted directly the vise 2 by means of the base plate thereof. The base plate has in its lower area laterally projecting clamping flanges 3, which are engaged by the clamping members 4. The clamping members are urged against the clamping flanges 3 by means of clamping screws 5, which are screwed into anchor blocks 6 (FIG. 3). It is necessary to pivot the vise into various angular positions in order to work on the workpieces.

Figure 1:
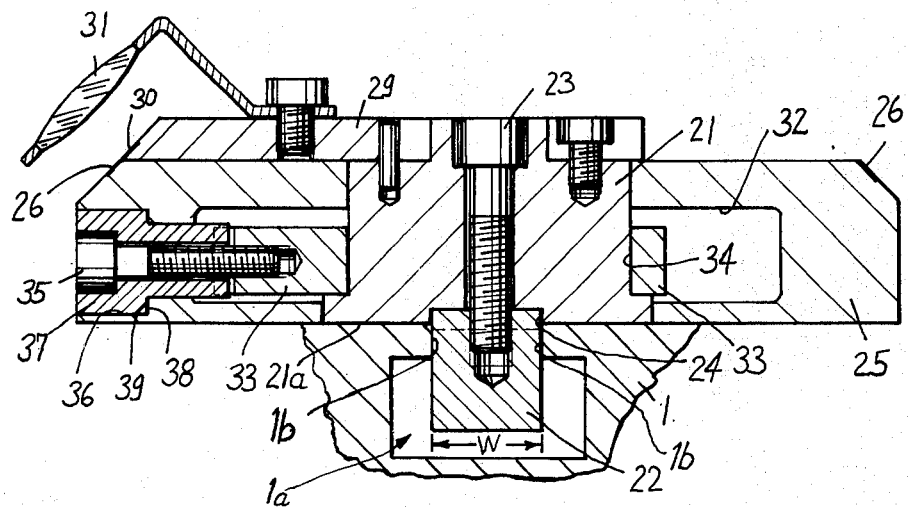
FIG. 1 is a cross-sectional view of an angle setting mechanism along the line I—I of FIG. 2, which angle setting mechanism can be used in combination with a machine vise.
Figure 2:
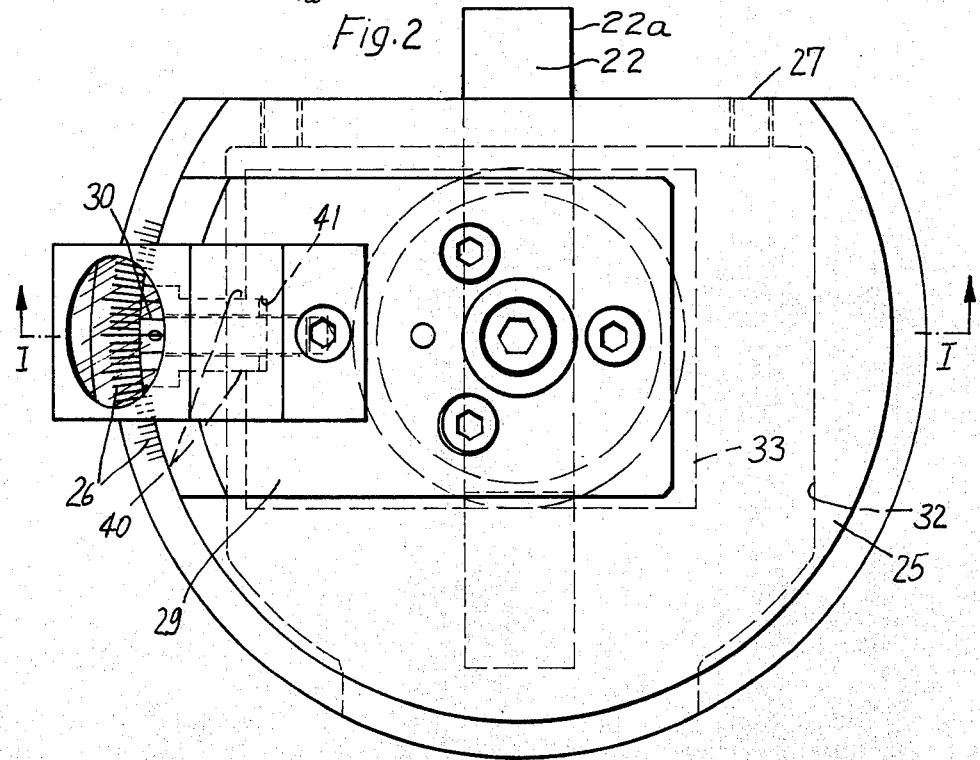
FIG. 2 is a top view of the angle setting mechanism.

For obtaining the exact angle setting of the vise, there is used the angle setting mechanism illustrated in FIGS. 1–3. Same consists of a pivot 21, which has on its underside 21a a reference slide 22 which can be inserted into the T-groove 11 of the machine table 1. The width of the reference slide corresponds closely to the width W of the leg section 11a of the T-groove 11. Since different machine tables have T-grooves of different widths, the reference slide 22 is advantageously connected interchangeably through a screw to the pivot 21. The exact angular position of the side surface 22a of the reference slide 22 with respect to the pivot 21 is determined by a groove 24, into which is received the reference slide 22. The pivot 21 is encircled by a graduated disk 25 which is rotatably supported on the pivot 21 and can be clamped with respect to the pivot. The graduated disk has a scale 26 with suitable graduations thereon. It also has a flat guide face 27 which is arranged perpendicularly to the underside 21a of the pivot 21, which guide face extends along a chord of the otherwise round graduated disk. The guide face 27 is used to rest against a planar side surface 28 of the vise 2. Such a planar side surface, which extends parallel to the clamping direction of the vise, is provided for the purpose of alignment of the face on most vises. Furthermore the pivot has on its upper end an indexing plate 29 which is fixedly connected to said pivot and which has a vernier 30 cooperating with the graduation 26, and the zero line 30a of which is fixed exactly opposite and perpendicular to the side surface 22a of the reference slide. A magnifying lens 31 may be secured on the indexing plate for a better reading of the graduation and the vernier.

For clamping the graduated disk relative to the pivot 21 the hereinafter described clamping mechanism is advantageously used.

A clamping plate 33 is provided in the cavity 32 of the hollow graduated disk 25 and includes a hole 34 through which the pivot 21 projects. The screw 35 is screwed into this clamping plate, which screw is surrounded by a guide sleeve 37 inserted into a radial hole 36 in the graduated disk 25. The guide sleeve is supported by a surface 38 on a shoulder 39 in the hole 36. Its inner end has on both sides two flat parts 40, which engage the walls defining a rectangular recess 41 of the clamping plate 33. If the screw 35 is tightened, the graduated disk is urged from the left (as seen in FIG. 4) against the pivot, while the clamping plate at its hole 34 rests against the pivot from the right. In this manner, the desired clamping is achieved without risking damage to the cooperating surfaces. After the graduated disk is adjusted to the desired angle setting and is clamped, it is moved with its guide face 27 against the side surface 28 of the vise and said vise is then rotated until the guide face 27 rests with its entire length on the side surface 28.

In order to make the adjusting operations still easier, and in order to prevent the vise because of its easy pivotability from further rotation during tightening of the clamping screws 5, it is advantageous if a magnet holding bar 42 is screwed on the guide face 27. The magnet holding bar has two permanent magnets 43 which can be fastened on the side surface 28 and which can be taken off easily. Here too the graduated disk is first adjusted to the desired angular position and clamped in said position and then the entire angle setting mechanism is moved with the reference slide 22 inserted into the leg section 11a of the T-groove 11 sufficiently to cause the magnet holding bar 42 to come close to the side surface 28.

By pivoting the vise and moving the angle setting mechanism, both magnets 43 can be caused to rest on the side surface 28, through which the vise is held in its angular position. Subsequently the clamping screws 5 can be tightened, without causing the vise again to rotate. To make the removal of the angle setting mechanism simpler, the magnets 43 are advantageously removable. After removal of the angle setting mechanism, the clamping jaw which is identified by reference numeral 4' in FIG. 3 can be moved along the T-groove far enough to enable it to engage the associated clamping face of the vise.

Anchor members 50, 60 and 70 are illustrated in FIGS. 4-11, which anchor members can be inserted into the groove 24 of the pivot 21 in place of the reference slide 22. Since all remaining parts of the angle setting mechanism correspond with the exemplary embodiment illustrated in FIGS. 1–3, only the anchor members 50, 60, 70 are illustrated in three different embodiments. This anchor member can be adjusted in the leg section 11a of the T-grooves 11 and it can thus be used for various widths of grooves. Each side surface 51, 61, 71 of each anchor member 50, 60, 70 is fixed exactly opposite and perpendicular the zero line 30a of the indexing plate 29, which is accomplished by each anchor member 50, 60, 70 so engaging that its upper part 50a, 60a, 70a closely fits the groove 24 provided in the underside of the pivot 21. The anchor members 50, 60, 70 are connected further through not illustrated screws, similar to the reference slide 22, by the screw 23 to the pivot 21.

In the exemplary embodiment illustrated in FIGS. 4–6, the adjustable anchor member 50 has on each of its ends a tightening screw 52, the axes of which extend perpendicularly to the side surface 51. The disk-shaped head 53 of each tightening screw 52 is used for adjustment. In order to avoid an unintended hanging of the tightening screws 52, a brake shoe 55 can act laterally on each of the tightening screws, said brake shoe being loaded by the spring 54. The tightening screws can be already adjusted prior to the insertion of the anchor member 51 into the groove 11 at a respective groove width b or B. In this manner, the anchor member 50 can be used for grooves of different widths. After insertion of the anchor member 50 into the T-groove, one can by rotating the disk-shaped head 53 closely adjust the tightening screws 52, so that the anchor member is pressed easily with its side surface 51 against the leg section 11a of the groove 11. The angle setting mechanism is thus fixed precisely with respect to the machine table.

In the exemplary embodiment illustrated in FIGS. 7 and 8, the anchor member 60 has in its lower area a wedge 63 which can be moved parallel to the side surface 61 by means of a screw 62. The angular surface 64 of this wedge rests on the side remote from the side surface 61 against an inner edge 11b of the leg section 11a. By rotating the screw 62 which may be guided through the pivot 21, one can move the wedge in elevational direction relative to the anchor member 60. In this manner, the wedge surface 63 rests on the edge 11b and the side surface 61 is pressed against the leg section 11a of the T-groove 11. Also this adjustable anchor member 60 is, as can be seen from FIG. 8, usable for different groove widths b or B.

In the exemplary embodiment illustrated in FIGS. 9–11, the adjustable anchor member 70 has an eccentric 72, which is rotatable about an axis parallel to the side surface 71. A pin 73 which is fixedly connected to the eccentric 72 is used for rotating the eccentric. This pin too may be guided through the pivot 21. By rotating the eccentric, the anchor member 70 may be adjusted in the leg section 11a.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An angle setting mechanism for indicating an angle to which an angularly adjustable vise is to be adjusted, comprising:
   a. pivot means, said pivot means having an adjusting slide means secured to a planar underside thereof and which is adapted to be inserted into a T-groove in a machine table, said slide means having a width to fit snugly into and engage at least one of the opposed walls of the narrowest section of said T-groove;
   b. a graduated disk rotatably supported on said pivot means, said graduated disk having a scale and a straight guide face thereon, said guide face being perpendicularly arranged to said planar underside of said pivot means and adapted to abut a plane side surface on said vise;
   c. an indexing plate fixedly connected to an upper surface of said pivot means and has a vernier thereon cooperating with said scale, said vernier having a zero line which is fixed exactly opposite and perpendicular to at least one side surface on said adjusting slide means which engages one of said opposed walls of said T-groove, said scale and zero line indicating the relative angle of said guide face to the longitudinal axis of said T-groove; and
   d. releasable clamping means for securing said graduated disk to said pivot means;
whereby said angle setting mechanism is independent of said vise and is placed beside and abuts said plane side of said vise so that said scale and zero line will indicate the relative angle of said vise to the longitudinal axis of said T-groove.

2. The angle setting mechanism according to claim 1, wherein said graduated disk is hollow and said clamping means comprises a clamping plate in the interior of said disk having a concentric hole therethrough which receives said pivot means therein and a radially directed screw on said graduated disk engaging said clamping plate to urge said clamping plate into engagement with said pivot means upon a rotation of said screw.

3. The angle setting mechanism according to claim 2, wherein said screw is surrounded by a guide sleeve which is positioned in a radial hole in said graduated disk, the inner end of which guide sleeve has flat parts on each side engaging a rectangular recess in said clamping plate.

4. The angle setting mechanism according to claim 1, including a magnifying lens mounted on said indexing plate.

5. The angle setting mechanism according to claim 1, including a magnet holding bar attached to said guide face, said magnet holding bar having at least one permanent magnet which is mounted on said side surface of said vise.

6. The angle setting mechanism according to claim 5, wherein said permanent magnet is removable from said guide face.

7. The angle setting mechanism according to claim 1, wherein said adjusting slide means is connected to said pivot means by a screw and is interchangable with other adjusting slide means.

8. The angle setting mechanism according to claim 1, wherein said adjusting slide means engages with its upper part a groove in said underside of said pivot means.

9. The angle setting mechanism according to claim 1, wherein said adjusting slide means is an adjustable anchor member and has a tightening screw thereon at each of both ends thereof, the axis of said tightening screw extends perpendicularly to a side surface of said anchor member and said tightening screw has a disk-shaped head.

10. The angle setting mechanism according to claim 1, wherein said adjusting slide member is an adjustable anchor member and has in its lower area at least one wedge which is movable in a direction parallel to a side surface of said anchor member by means of a screw, said wedge surface engaging on the side remote from said side surface an inner edge of said leg section.

11. The angle setting mechanism according to claim 1, wherein said adjusting slide member is an adjustable anchor member and has at least one eccentric which is rotatable about an axis parallel to a side surface of said anchor member and projects outwardly on a side opposite to said side surface of said anchor member.

* * * * *